United States Patent [19]
Motose

[11] Patent Number: 6,039,013
[45] Date of Patent: Mar. 21, 2000

[54] EXHAUST TIMING VALVE CONTROL FOR WATERCRAFT ENGINE

[75] Inventor: Hitoshi Motose, Hamamatsu, Japan

[73] Assignee: Yamaha Hatsudoki Kabushiki Kaisha, Iwata, Japan

[21] Appl. No.: 08/996,536

[22] Filed: Dec. 23, 1997

[30] Foreign Application Priority Data

Dec. 25, 1996 [JP] Japan .................................. 8-345130
May 28, 1997 [JP] Japan .................................. 9-138611

[51] Int. Cl.[7] ...................................................... F02B 25/20
[52] U.S. Cl. ...................................................... 123/65 PE
[58] Field of Search ............................. 123/65 PE, 65 P, 123/65 EM

[56] References Cited

U.S. PATENT DOCUMENTS

| | | |
|---|---|---|
| 4,388,894 | 6/1983 | Tanaka et al. . |
| 4,986,780 | 1/1991 | Sougawa . |
| 5,190,006 | 3/1993 | Motoyama et al. ............... 123/65 PE |
| 5,337,707 | 8/1994 | Blundell et al. ................... 123/65 PE |
| 5,361,732 | 11/1994 | Kamata ............................. 123/65 PE |
| 5,373,816 | 12/1994 | Asai et al. ......................... 123/65 PE |
| 5,410,993 | 5/1995 | Masuda et al. . |
| 5,502,963 | 4/1996 | Inaba ................................. 123/65 PE |
| 5,575,246 | 11/1996 | Ito . |
| 5,598,813 | 2/1997 | Masuda et al. . |
| 5,605,119 | 2/1997 | Masuda et al. . |
| 5,782,214 | 7/1998 | Nanami et al. ................... 123/65 PE |
| 5,873,334 | 2/1999 | Heinrich ............................ 123/65 PE |

*Primary Examiner*—Marguerite McMahon
*Attorney, Agent, or Firm*—Knobbe, Martens, Olson & Bear LLP

[57] ABSTRACT

An exhaust timing valve control for an exhaust timing valve of an engine powering a watercraft is disclosed. The engine has an exhaust port leading from a combustion chamber for routing exhaust products therefrom, the exhaust timing valve cooperable with the exhaust port and movable between a first position for delaying the closing of said exhaust port and a second position for advancing the closing of said exhaust port. The watercraft includes a power source which provides power when the engine is started. The exhaust timing valve control includes a mechanism for turning on the control when the engine is started and the power source provides power, and for turning off the control when the engine is stopped.

13 Claims, 10 Drawing Sheets

EXHAUST TIMING VALVE CONTROL FOR WATERCRAFT ENGINE

FIELD OF THE INVENTION

The present invention relates to an exhaust timing valve of an internal combustion engine powering a water propulsion device of a watercraft. More particularly, the invention is a control for such an exhaust timing valve.

BACKGROUND OF THE INVENTION

Internal combustion engines include exhaust control mechanisms for controlling the flow of exhaust from each combustion chamber of the engine. In most instances, these mechanisms comprise valves.

In those instances where the engine operates on a two-stroke or two-cycle principal, the valve is often of the sliding or rotating type. Generally, this type of valve does not serve to ever completely close the opening or port in the combustion chamber wall or the exhaust passage. Instead, the valve moves between a first position in which the valve does not obstruct or obstructs very little of the exhaust port, and a second position in which the valve partly obstructs the port. Because the sliding or rotating type valve can partially obstruct the exhaust passage, it can be used to control the timing of the exhaust flow, and thus the performance or running conditions of the engine.

There is desired an improved control arrangement for controlling this type of exhaust timing valve.

In addition, the sliding or rotating type valve suffers partly in its reliability. Because these valves have a relatively small range of movement and are not continuously moved, they may seize within the guide in which they are mounted. Providing lubricant to the valve reduces this problem somewhat, but suffers from the attendant problem that the high temperature of the engine may reduce the lubricant into carbon deposits on the valve, causing the valve to seize.

There is also desired a control for improving the reliability of the exhaust timing valve.

SUMMARY OF THE INVENTION

In accordance with the present invention, there is provided a control for an exhaust timing valve of an engine.

Preferably, the engine is of the type including at least one combustion chamber having an exhaust port or passage leading therefrom for directing exhaust from the combustion chamber. A valve cooperates with the port to control the timing of the flow of exhaust from the combustion chamber. The valve is movable between a first position in which the valve is retracted and the exhaust flow timing is advanced, and a second position in which the valve is extended into the port and the exhaust flow timing is retarded.

The watercraft preferably includes a power source which provides power when the engine is started. In one embodiment, the power source is a battery which provides power when a starter motor circuit is activated. In other embodiments, the power source is a generator or pulser coil associated with the engine.

An exhaust timing valve control is provided for controlling the exhaust timing valve. The exhaust timing valve control includes means for turning on the control when the power source provides power when the engine is started, and for turning off the control when the engine is stopped. Preferably, the control is arranged to control an electric motor which is arranged to control the position of the exhaust timing valve.

In a preferred embodiment of the invention, the control is arranged to perform an exhaust timing valve cleaning operation after the engine is shut off. In this operation, the exhaust timing valve is preferably moved between its retracted and extended positions.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

The present invention is a control for an exhaust timing valve associated with an engine powering a watercraft, and more particularly, a personal watercraft. The exhaust timing valve control of the present invention is described for use in controlling an exhaust timing valve of an engine used in powering a personal watercraft since this is an application for which the control has particular utility. Those of skill in the art will appreciate that the control may be used in a variety of other applications.

Figure 1:
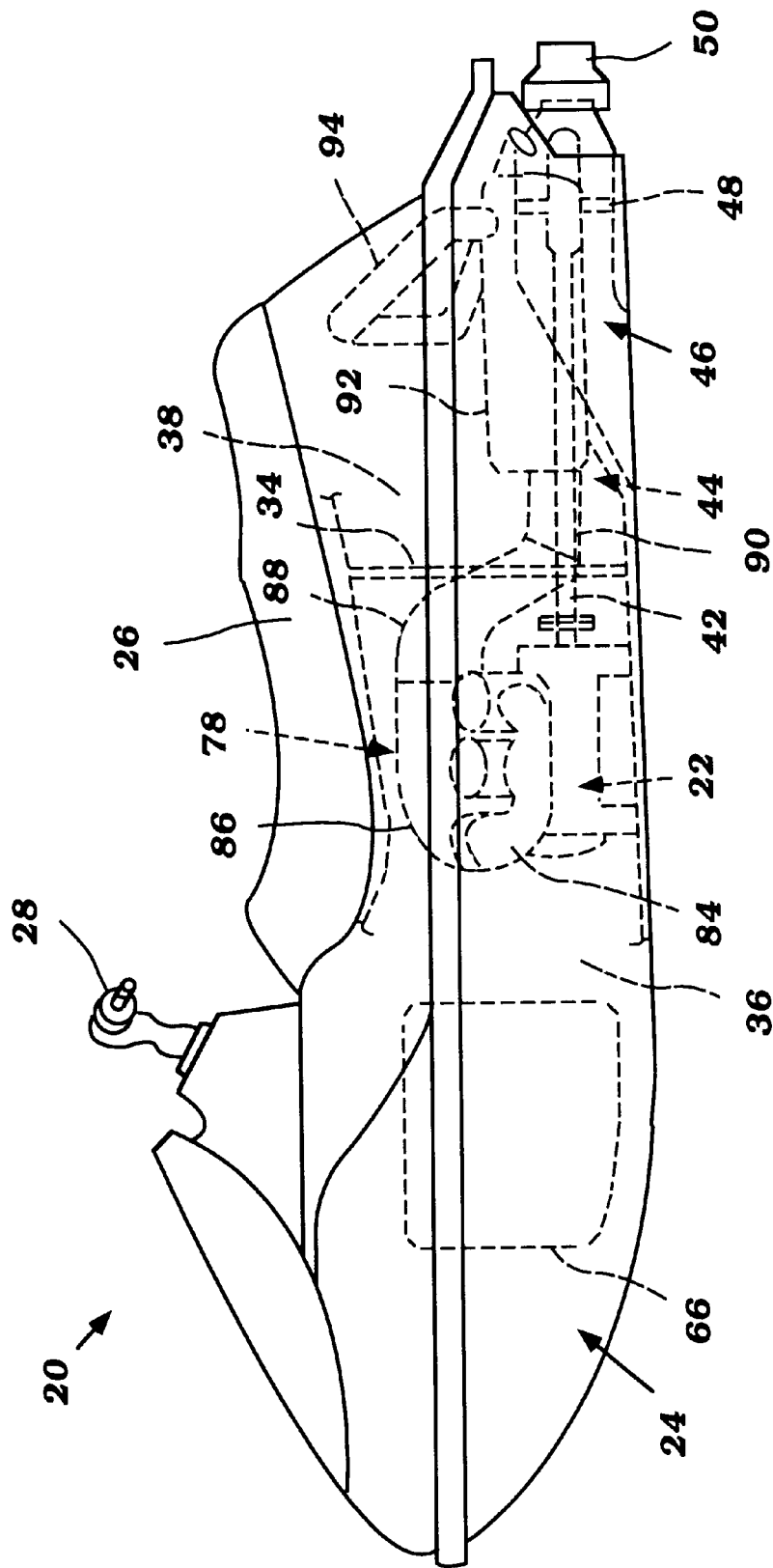
FIG. 1 is a side view of a personal watercraft of the type powered by an engine having an exhaust control in accordance with the present invention, the engine and other watercraft components positioned within the watercraft illustrated in phantom.
Figure 2:
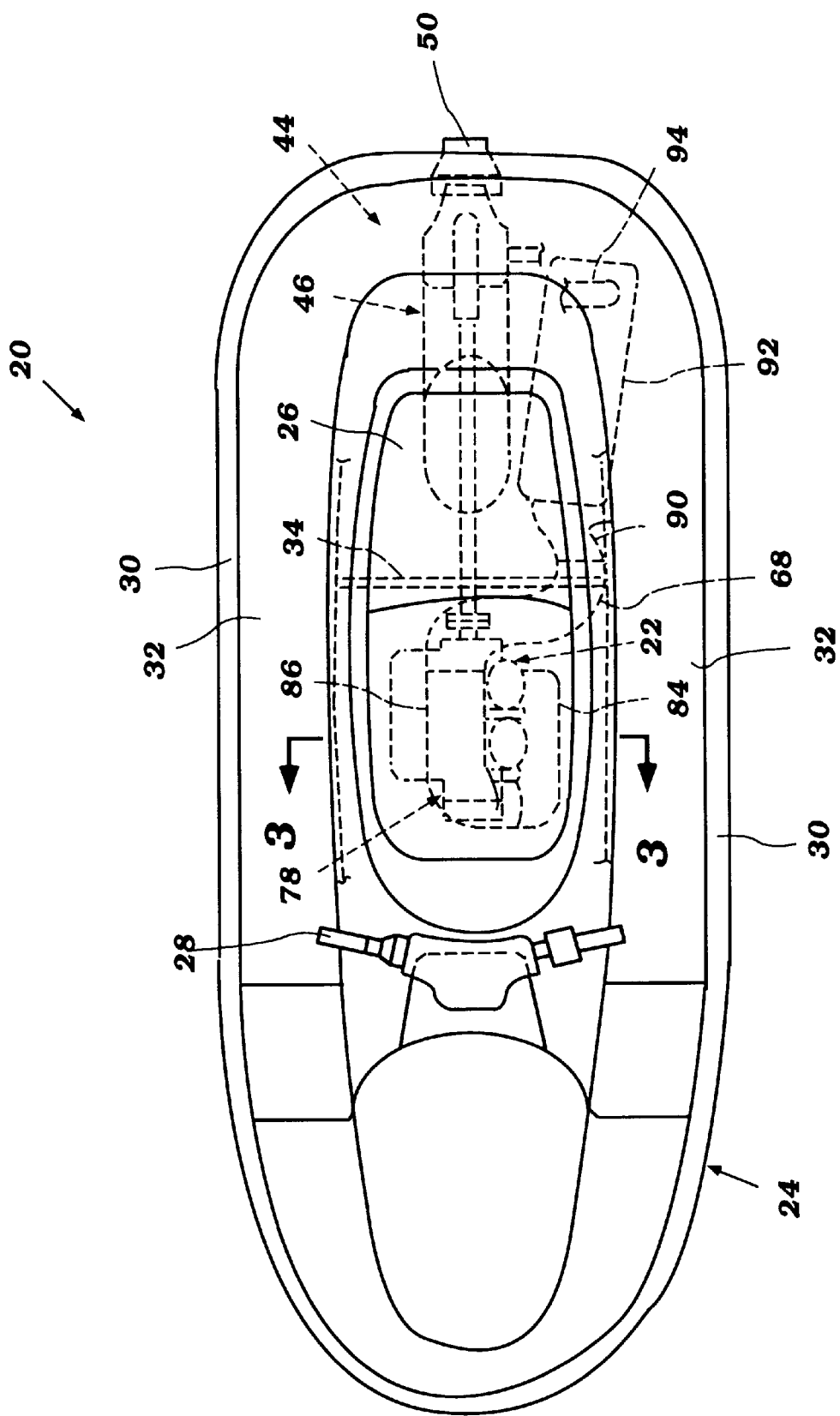
FIG. 2 is a top view of the watercraft illustrated in FIG. 1, with the engine and other watercraft components positioned within the watercraft illustrated in phantom.

FIGS. 1 and 2 illustrate a watercraft 20 having a hull 24. A seat 26 is positioned on a top portion of the hull 24. The seat 26 is preferably connected to a removable deck member. A steering mechanism 28 is provided adjacent the seat 26 for use by a user in directing the watercraft 20.

As best illustrated in FIG. 2, a bulwark 30 extends upwardly along each side of the watercraft 20. A foot step area 32 is defined between the seat 26 and its adjacent bulwark 30. The hull 24, along with a bulkhead 34, define an engine compartment 36 and a pumping chamber 38. The engine 22 is positioned in the engine compartment 36. The engine 22 is preferably partially accessible through a maintenance opening accessible by removing the removable deck member on which the seat 26 is mounted.

The engine 22 has a crankshaft 40 (see FIG. 3) which is in driving relation with an impeller shaft 42. The impeller shaft 42 rotationally drives a means for propelling water of a propulsion unit 44. Referring to FIG. 1, the propulsion unit 44 includes a propulsion passage 46 having an intake port which extends through the lower portion of the hull 24. The means for propelling water preferably comprises an impeller 48 positioned in the passage 46.

The impeller 48 draws water from the body of water in which the craft 20 is positioned into the intake port and expels it through an outlet at the stem or rear of the craft 20. Preferably, a nozzle 50 is movably mounted at the outlet for directing the water which is expelled therefrom. The nozzle 50 is linked to the steering mechanism 28, whereby the operator of the watercraft 20 may move the nozzle 50, directing the water expelled through the outlet, thus guiding the watercraft 20.

Figure 3:
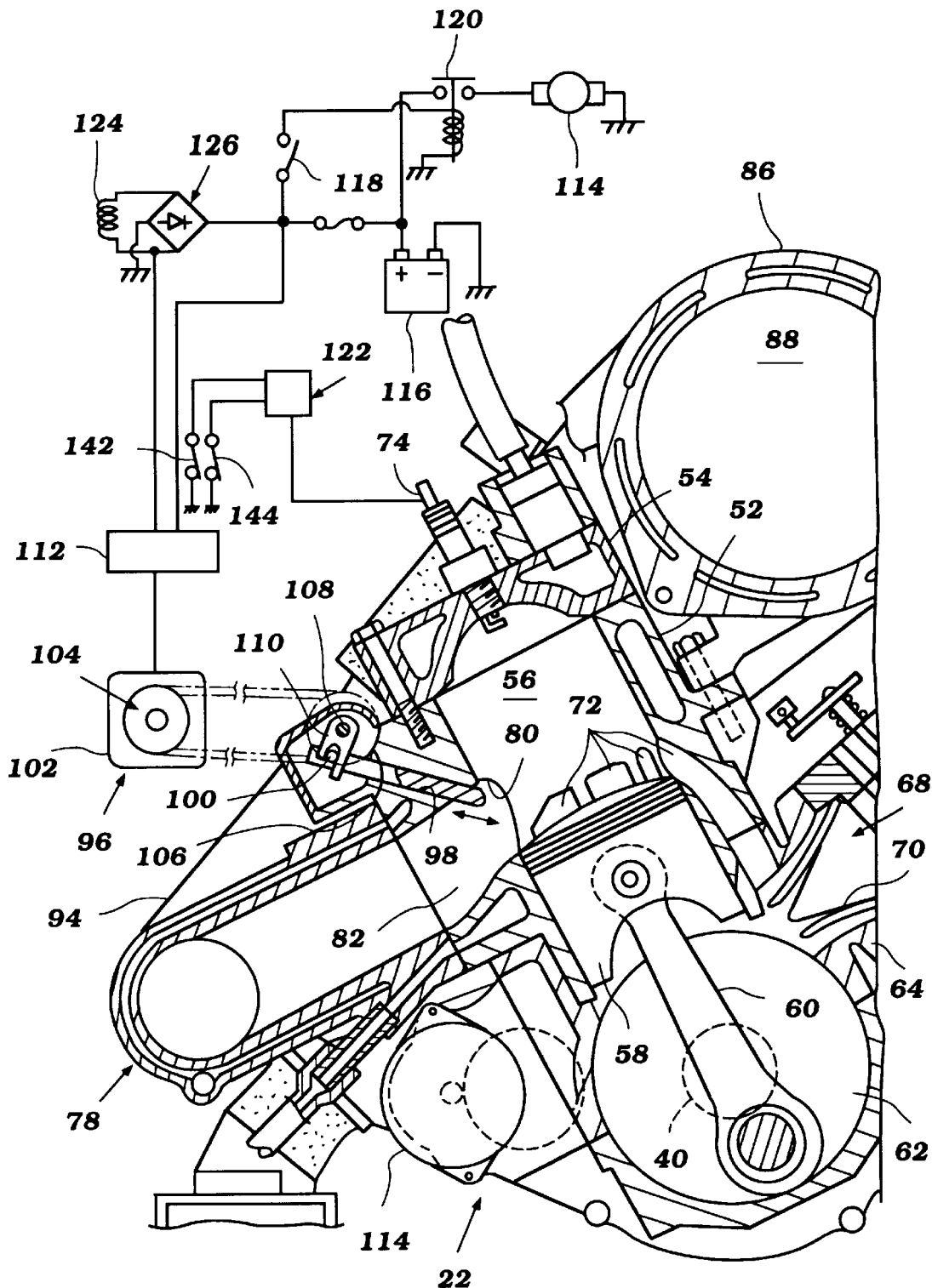
FIG. 3 is a cross-sectional view of the watercraft illustrated in FIG. 2, taken along line 3—3 therein, illustrating the engine and a number of electrical system components associated therewith.

The engine 22 is best illustrated in FIG. 3. As illustrated therein, the engine 22 is preferably of the two-cylinder, two-cycle variety. Of course, the engine 22 may have as few as one, or more than two, cylinders and operate in accordance with other operating cycles, as may be appreciated by one skilled in the art.

The engine 22 includes a cylinder block 52 having a cylinder head 54 connected thereto and cooperating therewith to define two cylinders 56. A combustion chamber is defined by a cylinder wall within the block 52, a recessed area in the cylinder head 54 and a top of a piston 58. The piston 58 is movably mounted in the cylinder 56 and connected to the crankshaft 40 via a connecting rod 60, as is well known in the art.

The crankshaft 40 is rotatably journalled by a number of sealed bearings with respect to the cylinder block 52 within a crankcase chamber 62. Preferably, the chamber 62 is defined by a crankcase cover member 64 which extends from a bottom portion of the cylinder block 52. The crankshaft 40 has pin portions extending between web portions with each connecting rod 60 connected to one of the pin portions.

As illustrated partly in FIG. 3, the engine 22 includes means for providing an air and fuel mixture to each cylinder 56. Preferably, an intake system is provided for delivering air for combustion to the engine. The intake system draws air from within the engine compartment 36 (the air entering the engine compartment through one or more air inlets in the hull 24) into a silencer (not shown) and delivered through a carburetor (not shown).

Fuel is provided to the incoming air. In particular, fuel is drawn from a fuel tank 66 (see FIG. 1) positioned in the engine compartment 36 by a fuel pump (not shown), and delivered through a fuel delivery line to the carburetor. A throttle valve (not shown) is preferably positioned along the intake path between the engine 22 and the carburetor for allowing the watercraft operator to control the rate of fuel and air delivery to the engine 22 for controlling the speed and power output of the engine via a throttle linkage. It is contemplated that the fuel may be provided by indirect or direct fuel injection, as well as via carburation, as known in the art.

The air and fuel mixture selectively passes through an intake port 68 into the crankcase chamber 62 as controlled by a reed valve 70, as is known in the art. As is also well known, an intake port 68 and corresponding reed valve 70 are preferably provided corresponding to each cylinder 56. The crankcase chamber 62 is compartmentalized so as to provide the crankcase compression feature for each combustion chamber as is well known in the operation of two-cycle engines.

The fuel and air charge within the crankcase chamber 62 is delivered to each cylinder 56 through several scavenge passages 72 leading to a number of scavenge ports in the cylinder wall.

Figure 7:
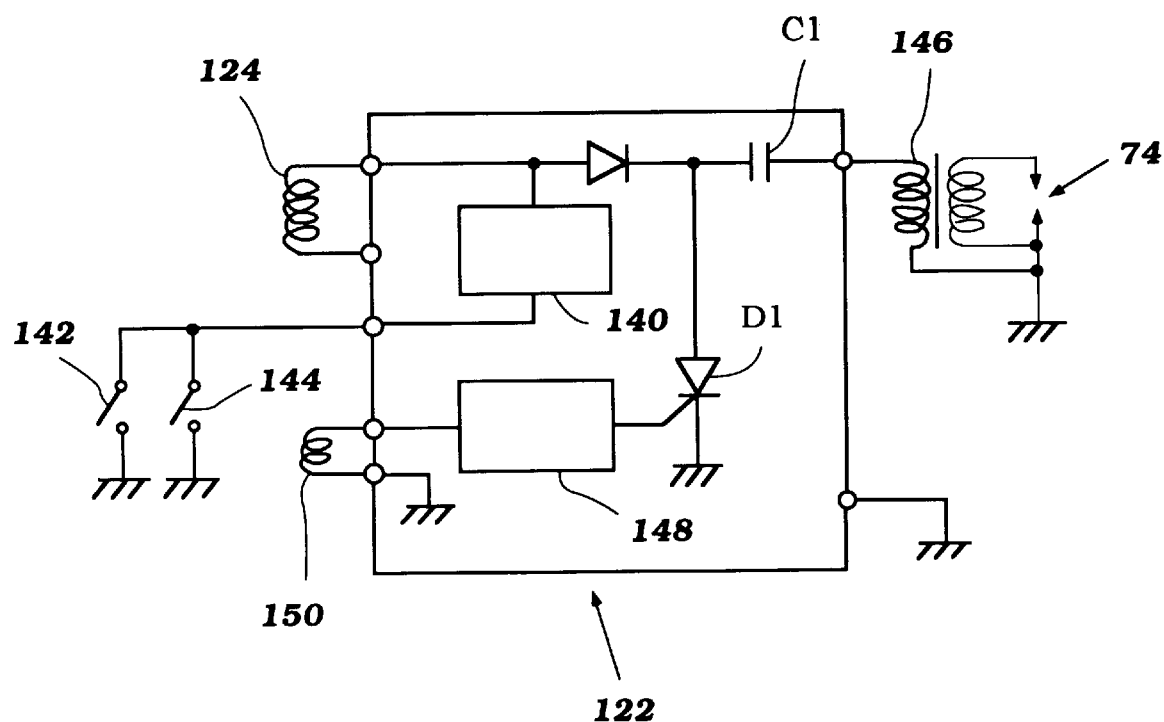
FIG. 7 is a circuit layout for an ignition control for use with an engine having the exhaust timing valve control of the first embodiment of the present invention.

A suitable ignition system is provided for igniting the air and fuel mixture provided to each combustion chamber. Preferably, this system comprises a spark plug 74 (see FIG. 3) corresponding to each combustion chamber. An ignition system control 122 for use in controlling the firing of the ignition elements 74 will be described with reference to FIGS. 3 and 7.

Figure 6:
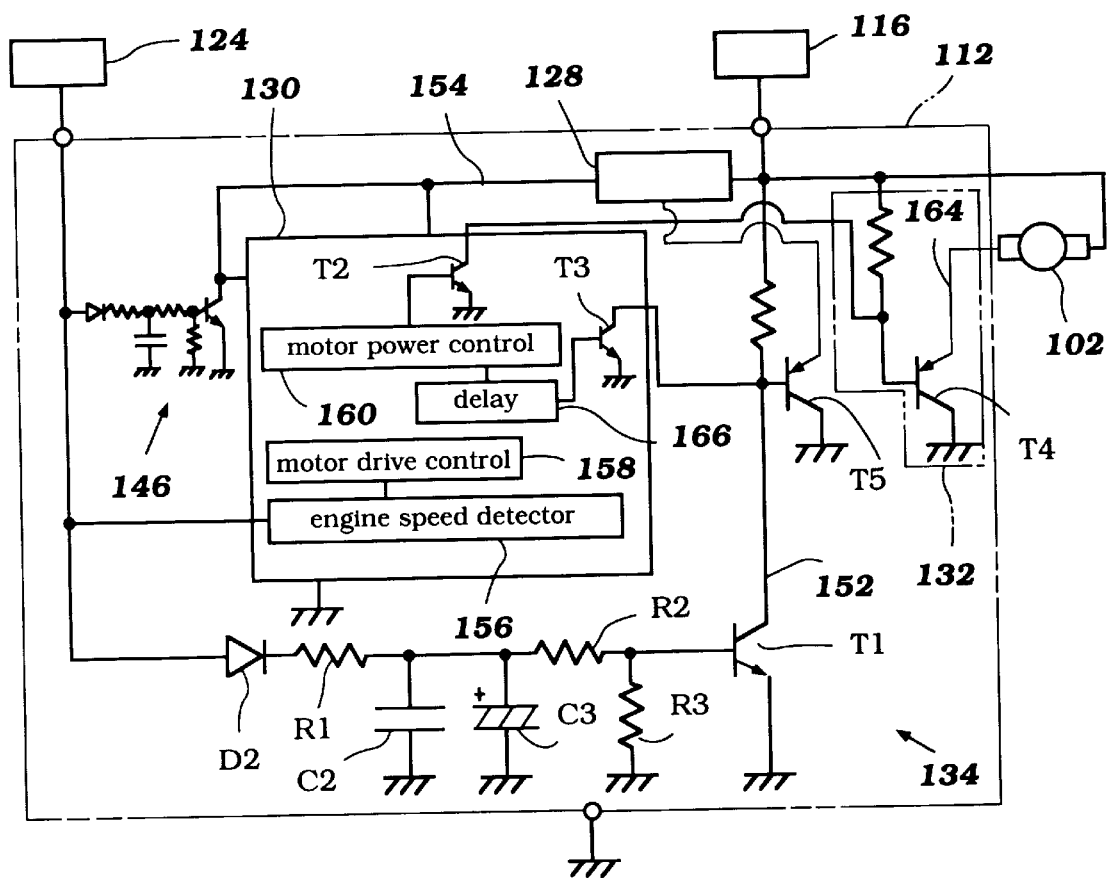
FIG. 6 is a circuit layout for the exhaust timing valve control illustrated in FIG. 5.

A generator 124 or battery 116 (used at start-up), both of which are described in more detail below, selectively powers a capacitor C1. A main control 140 is used to turn the circuit 122 on and off. If either a stop switch 142 or a kill switch 144 are activated (i.e. closed), then the main control 140 prevents the flow of power from the generator 124 to the capacitor C1. If both switches 142,144 are open (i.e. as illustrated in FIG. 6), power may flow from the generator 124 to the capacitor C1.

The capacitor C1 is arranged to selectively power an ignition coil 146. An ignition timing control 148 is provided for this purpose. Preferably, this timing control 148 receives timing data from a pulser coil 150 associated with the engine 22. The pulser coil 150 generates a pulse signal which controls the timing of the ignition firing by turning on and off a diode D1, which controls the flow of current from the capacitor C1 to the ignition coil 146, where its voltage is increased, and a spark is induced at the ignition element 74.

The stop and kill switches 142,144 may be of a variety of types known to those skilled in the art. These switches 142,144 are preferably arranged so that when closed, power is permitted to flow through the electric system associated with the engine, but if either switch is opened, power is prevented from flowing to at least the ignition circuit for stopping the engine.

In this arrangement, a flywheel (not shown) may be connected to one end of the crankshaft 40. The flywheel preferably has a number of magnets thereon for use in the pulser-coil 150 arrangement for generating firing signals for the ignition system. In addition, the generator 124 may be associated with magnets on the flywheel cooperating with a coil, or an entirely separate generator driven by the crankshaft 40, such as with a belt.

As illustrated in FIG. 3, the engine 22 preferably includes a starter motor 114. A starter circuit 113 is used to selectively energize the starter motor 114. The starter motor 114 is electrically powered by the battery 116 through the circuit 113 when a starter switch 118 is closed, thus causing a starter relay 120 associated with the circuit 113 to close and permit power to flow to the motor 114. As described below, when the switch 118 is closed, the ignition system control 122 is preferably also powered for firing the ignition elements 74 in starting the engine.

The engine 22 may include a lubricating system which provides lubricating oil to the various moving parts thereof. Such a system may include an oil tank or reservoir (not shown) from which lubricating oil is delivered and circulated throughout the engine, including for mixing with the fuel which is supplied to the engine, as is well known to those skilled in the art.

The engine 22 also preferably includes a suitable cooling system. Preferably, the cooling system is a liquid cooling system which draws cooling water from the body of water in which the watercraft 20 is being operated and circulates it through various cooling water jackets in the cylinder block 52, head 54, and the like.

Exhaust gas generated by the engine 22 is routed from the engine to a point external to the watercraft 20 by an exhaust system 78 which includes an exhaust passage or port 80 in the cylinder wall. An exhaust passage 82 extends from the port 80 through the cylinder head 54. An exhaust manifold 84 is connected to a side of the engine 22. The manifold 84 has a pair of branches with passages leading therethrough aligned with the passages 82 leading through the cylinder head 54. This pair of passages in the manifold 84 merges into a single passage through the manifold 84.

After the branches of the manifold 84 merge, the manifold curves around the front end of the engine 22. An expansion pipe 86 is connected to the exhaust manifold 84, preferably via a flexible sleeve. The expansion pipe 86 has an enlarged passage or chamber 88 through which exhaust routed from merge passage in the exhaust manifold 84 flows. As illustrated in FIG. 3, the expansion pipe 86 preferably extends along the top of the engine 22 in the direction of the front to the rear of the watercraft 20.

A catalyst (not shown) may be positioned within the expansion pipe 86.

After flowing through the expansion pipe 86, the exhaust flows into an upper exhaust pipe section 88 of the exhaust system. This portion of the exhaust system is tapers to a smaller diameter from that of the expansion pipe 86. This exhaust pipe 88 leads to a water lock 92. The upper exhaust pipe 88 is preferably connected to the water lock 92 via a flexible fitting 90, such as a rubber sleeve. The exhaust flows through the water lock 92, which is preferably arranged as known to those skilled in the art to prevent the flow of water through the exhaust system towards the engine 22, and then passes to a lower exhaust pipe 94 arranged to discharge the exhaust into the body of water in which the watercraft 20 is operating.

Means are provided for controlling the timing of the flow of exhaust gases through each exhaust passage 82 from the cylinder 56. Preferably, this means comprises an exhaust timing control device 96. The exhaust timing control device 96 comprises a sliding knifetype valve 98 and means for moving the valve.

As illustrated in FIG. 3, the valve 98 has a generally flat or plate-like body having a first end positioned in the passage 82 at the exhaust port 80, and a pin 100 positioned at the other end. The valve 98 is arranged to move between a retracted position in which the valve 98 does not generally obscure the passage 82, and an extended position in which the valve obscures a portion of the passage 82. When in its retracted position, the valve 98 may said to be in an "advancing" position, since the timing of the flow of exhaust from the cylinder occurs soon as the piston moves downwardly in the cylinder. On the other hand, when in the extended position, the valve 98 may be said to be in a "retarding" position, since the flow of exhaust from the cylinder is delayed since the piston must move farther down the cylinder before the passage 82 is opened.

While a variety of control strategies may be employed, it is common for the exhaust valve 98 to be positioned in its extended position when the engine speed is low, in the retracted position when the engine speed is high, and in some position between the retracted and extended positions at engine speeds between the low and high speeds.

The means for moving the valve 98 preferably comprises a motor 102 arranged to move the pin 100 connected to the valve 98. As illustrated, a linkage links the motor 102 and the pin 100. The linkage preferably comprises a drive pulley 104 driven by the motor 102, a driven pulley 108 rotatably mounted to the engine 22 near the valve 98 by a pin 108, a drive element 110 extending between the pulleys 104,106 and a slotted drive element 110 connect to the driven pulley 108. The pin 100 of the valve 98 extends into the slot of the drive element 110, whereby rotation of the driven pulley 108 causes movement of the valve 98.

In the situation where the motor 102 is powered in only one direction, the valve 98 is preferably arranged to be biased, such as with a spring, to its fully open position. In that instance, the motor 102 is arranged to counteract the spring and move the valve 98 into a variety of positions between its fully open and fully closed positions.

In accordance with the present invention, an exhaust timing valve control 112 is provided for controlling the movement of the valve 98 via the motor 102 or other valve-driving mechanism. Preferably, this control 112 is arranged to control the movement of the valve 98 based on the speed of the engine as detected from either the pulser coil 150 or the generator 124 associated with the engine 22.

Once the engine 22 has been started by the motor 114, the switch 118 opens, turning off the starter motor 114. When running, the engine 22 powers a generator 124. The power from the generator 124 is rectified into a DC current by a rectifier 126. The power from the generator 124 as rectified is used to charge the battery 116, and therethrough power the various electrically operated engine features, including the exhaust timing valve control 112.

Figure 4:
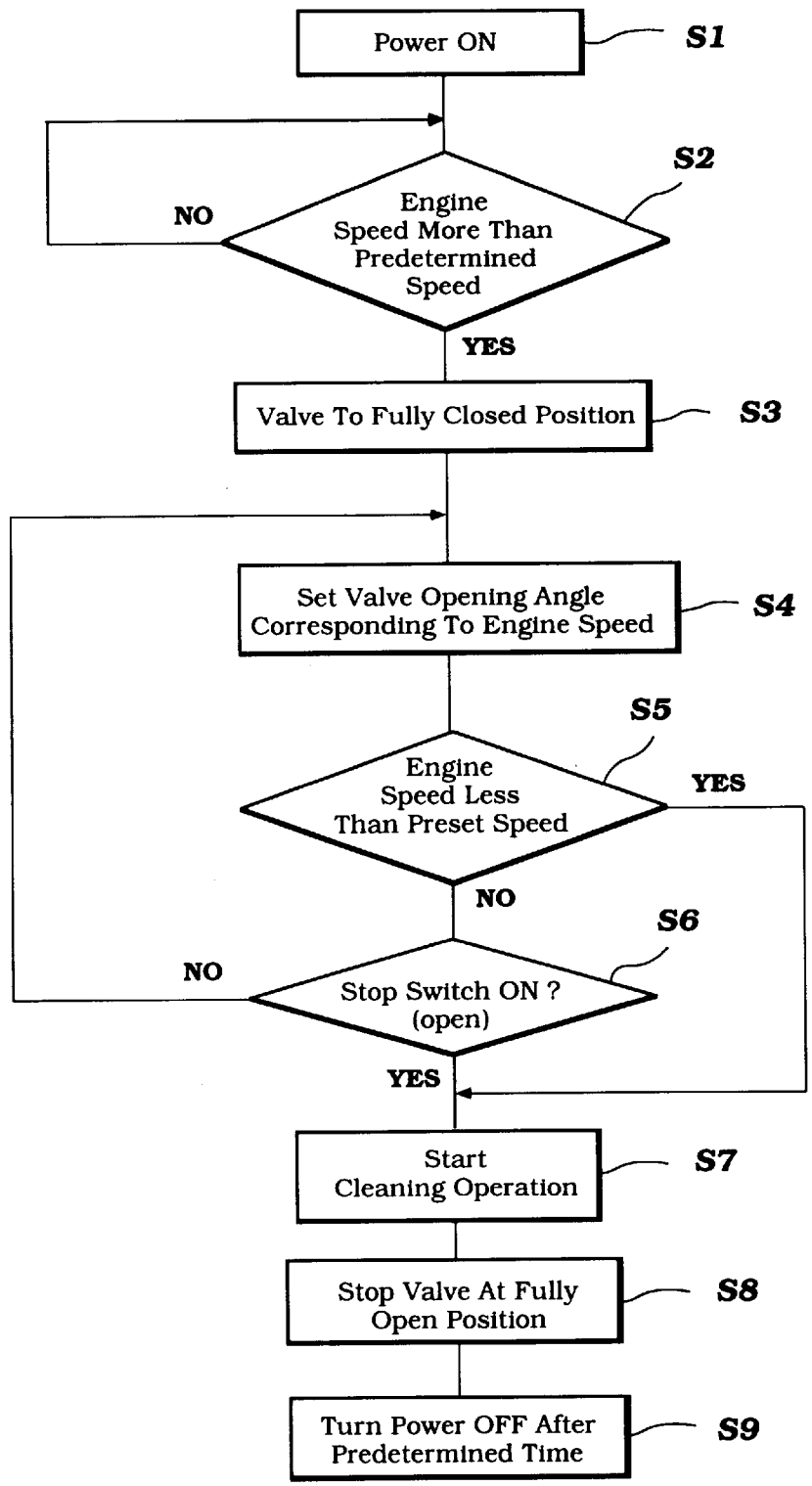
FIG. 4 is a flow diagram of an exhaust timing valve control strategy in accordance with the present invention.

The exhaust timing valve control 112 is preferably arranged to control the exhaust timing valve 98 in a manner illustrated in FIG. 4. As detail therein, the control 112 is arranged so that in after the start switch 118 or other on/off switch is operated and power is provided (as described in more detail below) to the control 112 (step S1), the control 112 checks the engine speed (step S2). Once the engine speed exceeds a predetermined speed indicating that the engine is running, such as 700 rpm, the control 112 moves the valve 98 to its fully closed position (step S3).

The control 112 then monitors the engine speed and moves the valve 98 to a position which corresponds to a desired valve position for that given engine speed (step S4). The control 112 next checks to see if the engine speed has fallen below a preset or predetermined speed (step S5). If not, the control 112 checks to see if the stop switch 142 has been turned ON (step S6). If not, then the control 112 returns to step S4 to check the engine speed and sets the valve 98 to the appropriate position.

If the engine speed in step S5 is below the preset speed, or if the stop switch 142 is ON (i.e. in a position indicating a desired stoppage of the engine) in step S6, then the control 112 moves to a step S7 in which the control operates the valve 98 in a cleaning operation, moving the exhaust valve 98 in and out. The control 112 then moves the valve 98 to its open position (step S8) and then turns the power off after a predetermined time (step S9).

Figure 5:
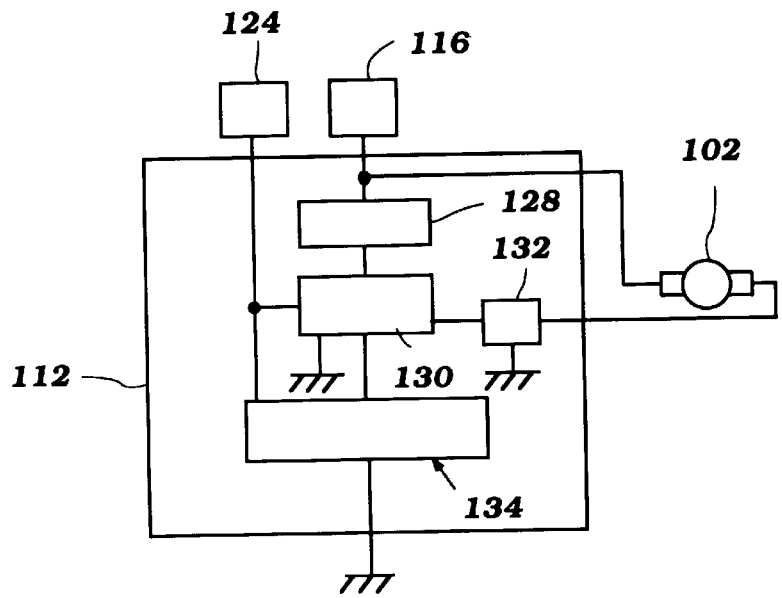
FIG. 5 is a schematic illustrating the exhaust timing valve control in accordance with a first embodiment of the present invention.

FIG. 5 schematically illustrates the exhaust timing valve control 112 in more detail. As illustrated, the control 112 includes a power unit 128, a processing unit (CPU) 130, a motor driver 132, and a built-in circuit control 134.

FIG. 6 illustrates a preferred circuit arrangement for the exhaust timing valve control 112. As illustrated, the power unit 128 is arranged to selectively power the CPU 130 at a voltage (such as 5 V) which is reduced from the voltage supplied by the electric system (normally 12 V).

The circuit control 134 is preferably arranged to turn on and off the control 112. In this preferred embodiment, the circuit control 134 is arranged to turn on an off the control 112 when power generated by the engine 22 via the generator 124 is sensed starting and stopping.

As illustrated, the circuit control 134 receives a voltage output from the generator 124, with current flowing through a diode D2 and then a resistor R1. The output then passes a noise-removing or high pass capacitor C2, selectively charges a charging capacitor C3 and then passes through a resistor R2 and then divides to a grounded resistor R3 and a transistor T1.

This circuit control 134 is arranged so that when a voltage is applied thereto when the engine 22 is started, the transistor T1 closes a main power circuit 152 to ground. Notably, the voltage which is supplied from the generator 124 when the engine first starts and is at a low rpm may be less than that sufficient to charge the battery 116. Nonetheless, the a small voltage output is provided which triggers the circuit control 134. When the transistor T1 is activated, this causes a transistor T5 to close, switching the power circuit 128 to it ON position. At this time, the power unit 128 turns on, providing a current at reduced voltage to the CPU 130 through a CPU power circuit 154.

The output of the generator 124 is also transmitted to the CPU 130 through a wave-forming circuit 146 of a type known in the art. This circuit 146 is preferably arranged to shape the wave form into an ON/OFF type signal. The signal is monitored by an engine speed detection apparatus 156 of the CPU 130 which counts the pulses over time to determine the speed of the engine 22. This engine speed detector circuit 156 provides engine speed data to a motor drive control 158 which determines the desired position of the valve 98 at the engine speed and the necessary motor activation necessary to achieve the desired valve position (such as from an exhaust valve/engine speed map).

The motor drive control 158 sends appropriate signals to a motor power control 160 of the CPU 130. At the appropriate times, the power control 160 applies an activation voltage to a transistor T2, which in turn causes activation of a transistor T4 associated with the motor drive 132. When the transistor T4 closes, power flows from the battery 116 through a circuit 164 to the motor 102, powering the motor 102 and moving the valve 98 to its appropriate position.

As the engine 22 continues to run, the CPU 130 continuously monitors the engine speed as determined by the pulses from the generator 124 and moves the valve 98 accordingly. When either the engine 22 is shut off, such as with the stop or kill switches 142,144 and the engine 22 stops, the control circuit 112, no longer seeing the generated power, is arranged to shut of the control 112. In particular, when a voltage is no longer applied to the circuit control 134 from the generator 124 (which stops generating power when the engine stops running) an activation voltage is no longer applied to the transistor T1 after a period of time. When this occurs, the transistor T1 opens, which would normally cause the power unit 128 to shut off, thus shutting of the CPU 130 and thus the entire control 112.

In accordance with a preferred embodiment of the invention, however, after the engine 22 is shut off, the control 112 is preferably arranged to perform an exhaust timing valve cleaning control operation. To perform this function, the control 112 includes a delay mechanism 166 which is arranged as follows. When the CPU 130 is powered and the power control 160 is operating, it is arranged to send an appropriate signal to the delay mechanism 166 at spaced intervals. If the signal is received, the delay mechanism 166 applies an activation voltage to a transistor T3. When activated, the transistor T3 activates the transistor T5, maintaining the power unit 128 on.

Thus, even when the engine 22 is stopped and the circuit control 134 shuts off, the power circuit 128 still provides power to the CPU 130 for a short time because the delay mechanism 166 is activating the transistor T3 which is activating transistor T5. During this time, when the engine speed detector 156 indicates that the engine speed has fallen below a predetermine speed, the control 158 instructs the motor power control 160 to open and close the valve 98 in a cleaning operation by powering the motor 102. In this manner, the exhaust timing valve 98 is cleaned of deposits, reducing the probability of the valve 98 sticking.

At the same time, the motor power control 160 is arranged to not send a signal to the delay 166. Thus, after a short period of time, no activation voltage is applied to the transistor T3 by the delay mechanism 166 and the transistor T5 opens. This shuts off the power circuit 128, stopping power from flowing to the CPU 130, and effectively shutting off the motor 102.

When the control 112 shuts off after the cleaning operation, the valve 98 is arranged, such as through spring biasing as described above, to move to its open position (as in step S8 in FIG. 4).

Figure 8:
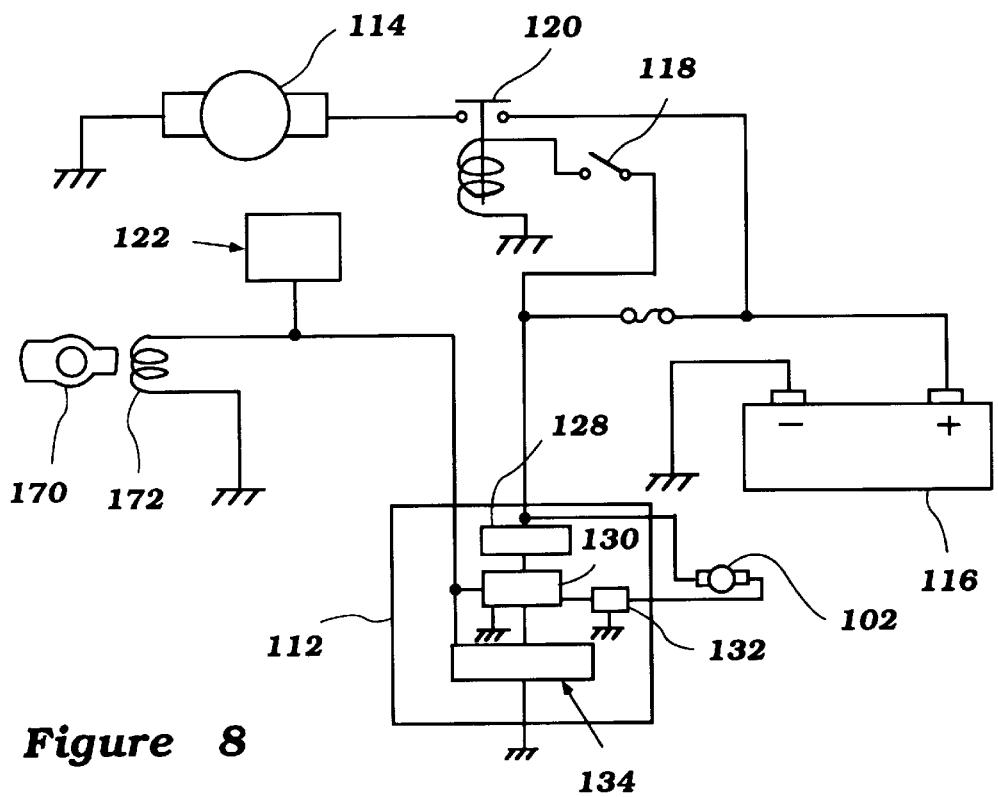
FIG. 8 is a circuit layout for an exhaust timing valve control in accordance with a second embodiment of the present invention.

FIG. 8 illustrates a circuit layout for the exhaust timing valve control 112 in accordance with a second embodiment of the invention. In the description and illustration of this embodiment, like parts have been given like reference numerals to those of the first embodiment. In this embodiment, the engine speed timing information is obtained from the pulser coil 150. As illustrated, this coil 150 comprises a rotor 170 driven by the crankshaft of the engine and associated with a coil 172. The pulser coil 150 generates data which, as described above, is used by the ignition system control 122 to control the timing of the ignition element firing.

In this embodiment, the output from the pulser coil 150 through the ignition system control 122 is utilized by the circuit control 134 of the exhaust timing valve control 112 to determine when the engine is started and stopped and thus for controlling the powering of the exhaust timing valve control 112. In addition, the output of the pulser coil 150 is used by the exhaust valve timing control 112 to determine the engine speed for use in controlling the exhaust valve 98 in a manner described above.

Figure 9:
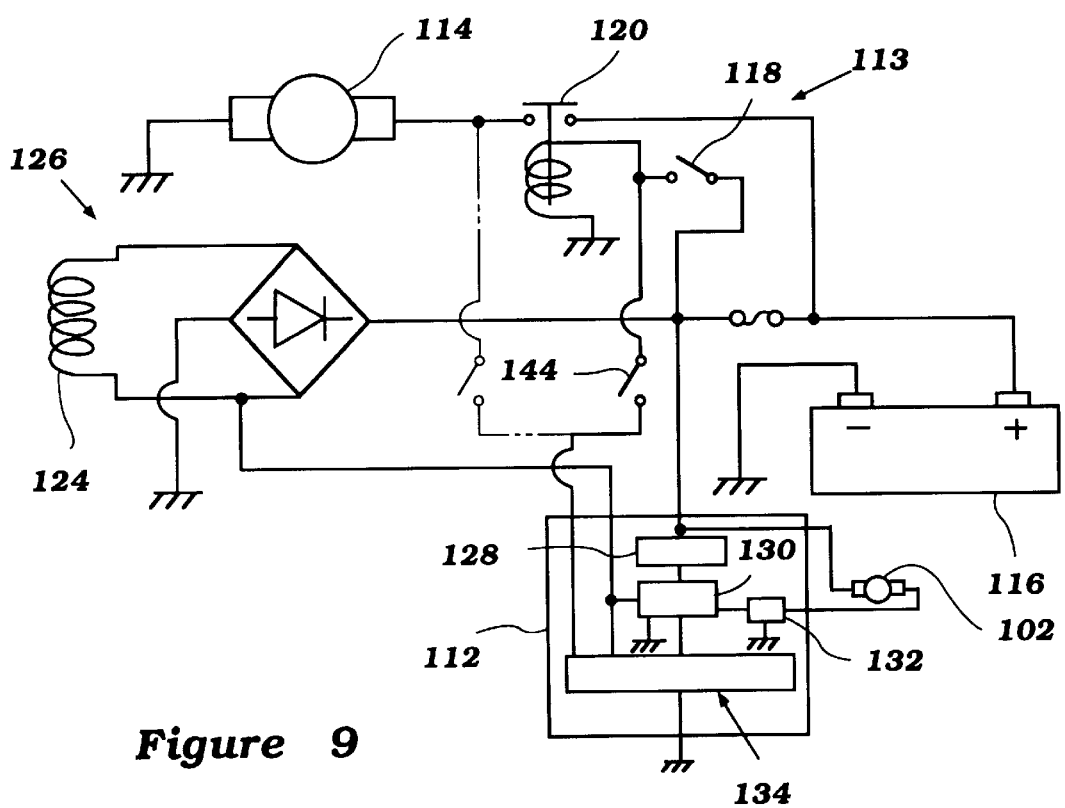
FIG. 9 is an overview circuit layout for an engine having an exhaust timing valve control in accordance with a third embodiment of the present invention.
Figure 10:
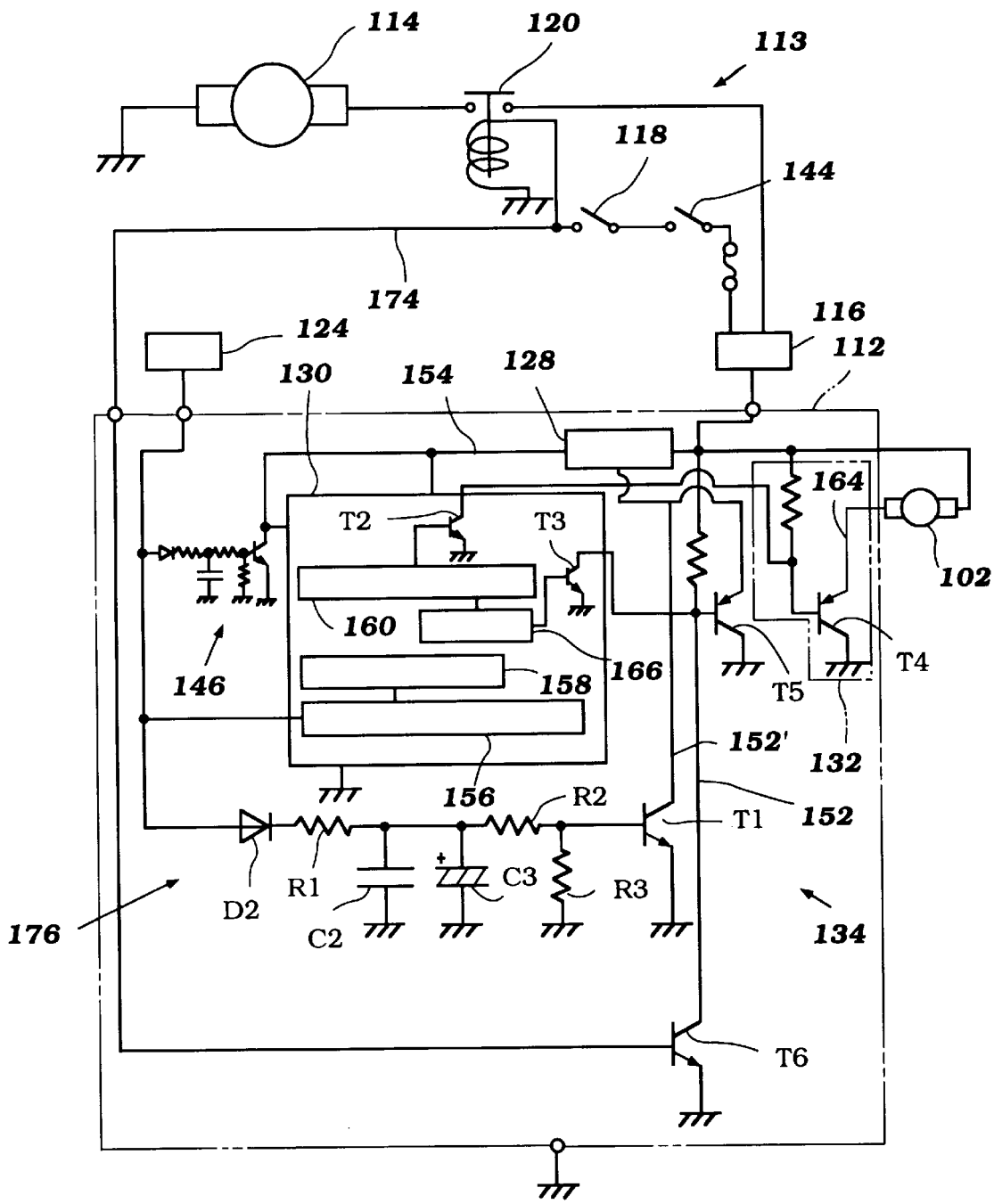
FIG. 10 is a circuit layout for the exhaust timing valve control in accordance with the third embodiment of the present invention.

FIGS. 9 and 10 illustrate an exhaust timing valve control in accordance with a third embodiment of the present invention. In the description and illustration of this embodiment of the invention, like parts have been given like reference numerals to those used in the description and illustration of the previous embodiments. In general, in accordance with this embodiment, the control 112 is preferably arranged to be turned on when the engine is started as signalled by the powering of the starter motor 114, and arranged to be turned off when the engine is stopped.

As illustrated in overview in FIG. 9, power is supplied to the circuit control 134 when the starter switch 118 is closed and the kill switch 114 is in the closed (off) position, then power flows from the battery 116 to the circuit control 134, indicating that the control 112 should be turned on. Once the engine 22 is running and the start switch 118 is re-opened, current does not flow through the starter circuit 113 to the circuit control 134, but instead power flows from the generator 124 to the circuit control 134, causing it to maintain the control 112 on. When, however, the engine 22 stops, as indicated by the lack of power flowing from the generator 124, the circuit control 134 is arranged to shut off the control 112.

A specific arrangement of the exhaust timing valve control 112 of this embodiment of the invention is illustrated in more detail in FIG. 10. As illustrated, a trigger circuit 174 extends from the starter circuit 113 to a main power circuit 152 of the control 112. Power flows from the battery 116 when the start switch 118 and kill switch 144 are closed. The current flows through the trigger circuit 174 to a transistor T6, which when activated, grounds the main power circuit 152, activating transistor T5 and thus turning on the power unit 128, which in turn turns on the CPU 130 in a manner described in conjunction with the first embodiment.

Once the engine 22 is started, the starter switch 118 moves to its open position, and no current flows through the trigger circuit 174. At this time, transistor T6 is no longer activated, and the power unit 128 would shut off, but for the continued activation of the power unit 128 by the generator 124 through the circuit control 134. In particular, once the engine is started and running, the generator 124 generates power which flows through an upper branch 176 of the circuit control 134 and activates transistor T1. This causes the power unit 128 to remain on, and thus the CPU 130 to remain on.

The CPU 130 then operates the exhaust timing valve 98 with the motor 120 in a manner described in conjunction with the first embodiment. When the engine is stopped, such as by opening the kill switch 144, transistor T1 is no longer activated. The power unit 128 would then shut off, but for the preferred arrangement of the delay 166 maintaining the power unit 128 on for a short duration after engine stoppage for performance of an exhaust timing valve cleaning operation, as also described in more detail above.

As may be appreciated, a similar arrangement to that described above may be provided where a main switch is provided between the battery 116 and circuit control 134, where a single main switch controls the flow of power to the electrical components associated with the engine. In that event, when the main switch is turned on and off, the circuit control 134 is preferably arranged to turn the exhaust timing valve control 122 on and off.

Figure 11:
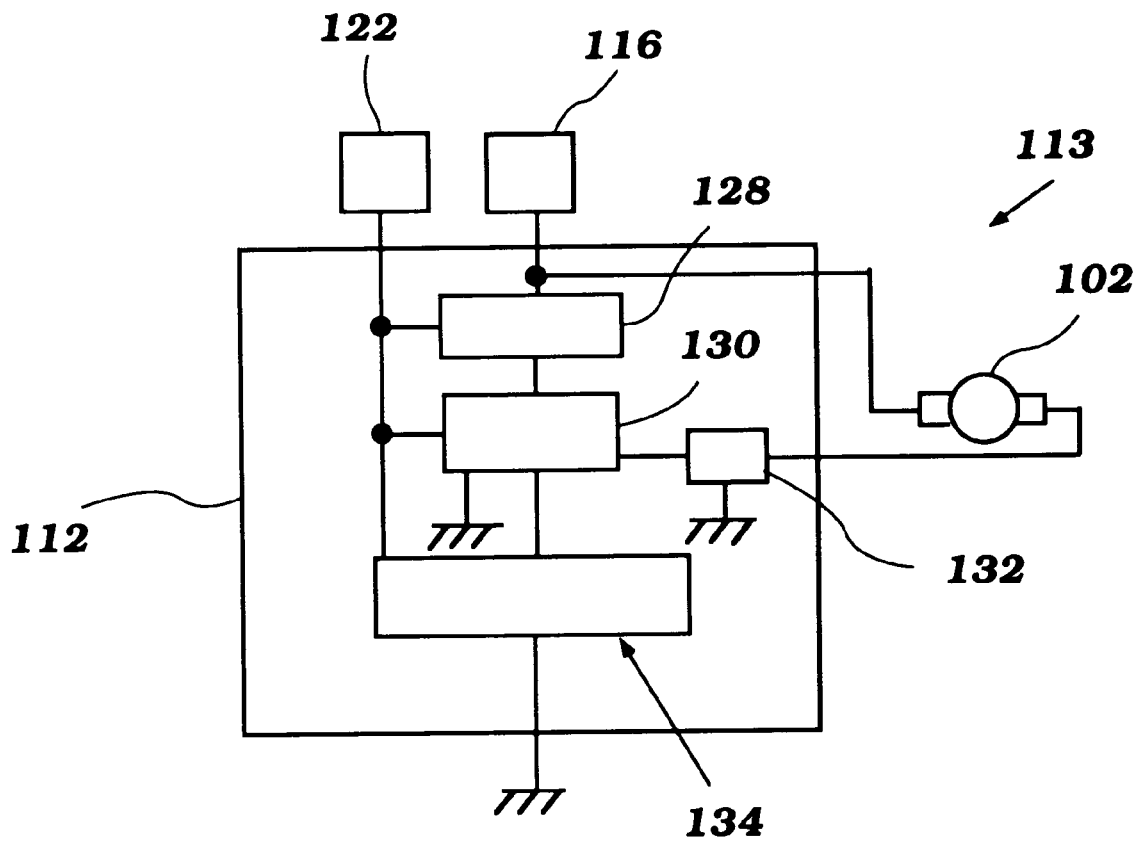
FIG. 11 is schematic illustrating an exhaust timing valve control in accordance with a fourth embodiment of the present invention.
Figure 12:
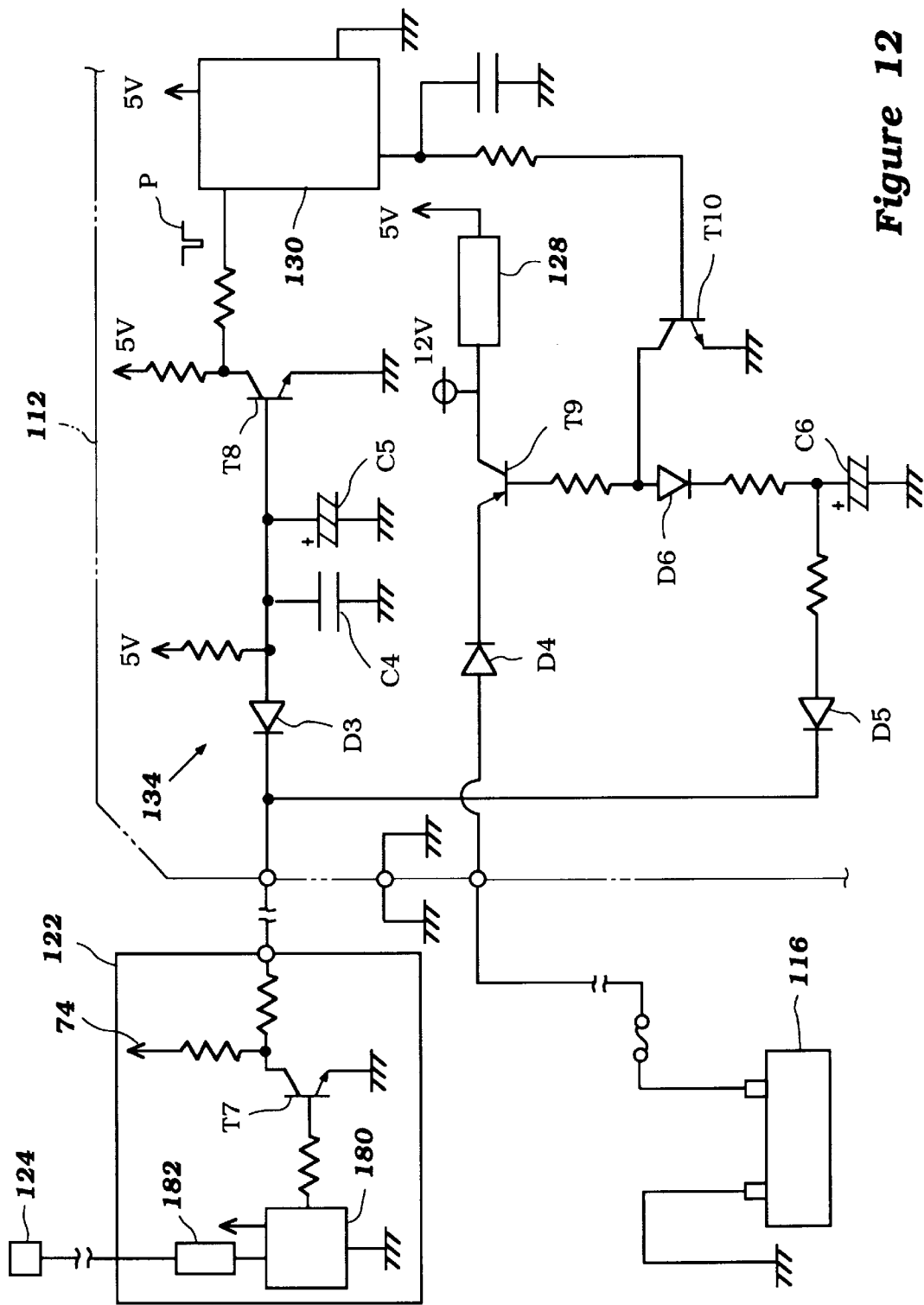
FIG. 12 is a circuit layout for an exhaust timing valve control illustrated in FIG. 11.

FIGS. 11 and 12 illustrate an exhaust timing valve control in accordance with a third embodiment of the present invention. In the description and illustration of this embodiment of the invention, like parts have been given like reference numerals to those used in the description and illustration of the previous embodiments. In general, in accordance with this embodiment, the control 112 is preferably arranged to be turned on when a voltage signal is provided by the ignition system control 122 of the engine, and arranged to be turned off when the ignition system control 122 no longer provides an output voltage signal.

FIG. 11 schematically illustrates this arrangement. In this embodiment, the ignition system control 122 includes a processor unit 180 which is arranged to control the firing of the ignition elements 74 through an ignition coil. The processor unit 180 receives a pulsed output from the generator 124 after having passed through a wave-shaping or forming circuit 182.

The processor unit 180 selectively controls a transistor T7, which in turn controls the firing of the ignition elements 74. When the processor unit 180 activates the transistor T7, a transistor T9 is activated along a circuit from the transistor T7, the circuit including a diode D5, large capacitor C6, and diode D6. This permits power to flow from the battery 116 through a diode D4 to the power unit 128. When the power unit 128 is turned on, it supplies power to the CPU 130 for controlling the motor which drives the exhaust timing valve, as in the manner described above in conjunction with the first embodiment.

The CPU 130 remains powered thereafter by activating a transistor T10, which in turn maintains the transistor T9 activated, continuing to permit power to flow from the battery 116 to the power unit 128.

The CPU 130 receives a pulsed output which it uses to determine the engine speed, as also described in detail in conjunction with the first embodiment. The pulsed output in this instance is the output of the ignition system control 122 through transistor T7. This pulsed output is arranged, through a diode D3, a pair of capacitors C4 and C5, and a transistor T8, to provide the CPU 130 with a pulse output P which it uses to control the motor.

When the engine is shut off, no pulsed output is provided to the CPU 130, and the CPU 130 preferably operates the valve 98 in a cleaning operation and then shuts off by deactivating the transistor T10, thus shutting of the flow of power from the battery 116 to the power unit 128 and thereon to the CPU 130.

While the control 112 has been described in conjunction with the control of a single exhaust timing control valve 98, the description is meant to apply to the similar control of each valve 98 associated with the engine 22.

Further, while the particular valve 98 which has been described is of the sliding knife-type valve, those of skill in the art will appreciate that the exhaust timing valve may comprise a rotating or other valve which provides the same or similar exhaust flow timing control.

Of course, the foregoing description is that of preferred embodiments of the invention, and various changes and modifications may be made without departing from the spirit and scope of the invention, as defined by the appended claims.

What is claimed is:

1. A watercraft having an engine powering a water propulsion unit, said engine having an exhaust port leading from a combustion chamber for routing exhaust products therefrom and an exhaust timing valve cooperable with said exhaust port and movable between a first position for delaying the closing of said exhaust portion and a second position for advancing the closing of said exhaust port, said watercraft including a power source which provides power when said engine is running, an exhaust timing valve control for controlling said exhaust timing valve, an engine operation condition sensor for sensing an engine operating condition, said exhaust timing valve control for controlling the position of said exhaust timing valve in response to the sensed engine operating condition, said exhaust timing valve control operating said exhaust timing valve through a cleaning cycle of operation in response to the speed of said engine falling below a predetermined speed.

2. The watercraft in accordance with claim 1, wherein said power source comprises a generator.

3. The watercraft in accordance with claim 1, wherein said power source comprises a pulser coil.

4. The watercraft in accordance with claim 1, wherein said power source comprises a battery providing power through an energized starter motor circuit.

5. The watercraft in accordance with claim 1, wherein said power source comprises a generator mechanism propelled by said engine, and wherein said engine operating condition sensor includes means for determining a speed of said engine from an output of said generator mechanism and for controlling the position of said valve based upon said speed of said engine.

6. The watercraft in accordance with claim 1, wherein said control further includes means for moving said valve in a cleaning operation when said engine is stopped.

7. The watercraft in accordance with claim 1, wherein said exhaust timing valve comprises a sliding knife-type valve.

8. The watercraft in accordance with claim 1, wherein said power source comprises an output from an ignition control unit.

9. An exhaust timing valve control for an exhaust timing valve of an internal combustion engine, the engine having at least one combustion chamber, an intake passage leading to said at least one combustion chamber for providing air thereto, a fuel supply for supplying fuel to said combustion chamber, and an exhaust port leading from said combustion chamber for routing exhaust products therefrom, said valve cooperable with said exhaust port and movable between a first position for delaying the closing of said exhaust port and a second position for advancing the closing of said exhaust port, power means powered by said engine for operating said valve, said exhaust timing valve control including means for moving said valve between said first and second position in response to a sensed engine operating condition, said exhaust timing valve control moving said valve through a cleaning cycle either when the speed of said engine falls below a predetermined low speed or an engine stop action is initiated.

10. The exhaust timing valve control in accordance with claim 9, wherein said means for moving includes a motor coupled to said valve.

11. The exhaust timing valve control in accordance with claim 9, wherein said power means comprises a generator.

12. The exhaust timing valve control in accordance with claim 9, wherein said power means comprises a pulser coil.

13. The exhaust timing valve control in accordance with claim 9, wherein said valve comprises a sliding knife-type valve.

* * * * *